(12) United States Patent
Marques

(10) Patent No.: US 11,666,045 B2
(45) Date of Patent: Jun. 6, 2023

(54) SUBMERSIBLE ILLUMINATING APPARATUS

(71) Applicant: Robert Joseph Marques, Lexington, KY (US)

(72) Inventor: Robert Joseph Marques, Lexington, KY (US)

( * ) Notice: Subject to any disclaimer, the term of this patent is extended or adjusted under 35 U.S.C. 154(b) by 0 days.

(21) Appl. No.: 17/568,150

(22) Filed: Jan. 4, 2022

(65) Prior Publication Data

US 2022/0211020 A1 Jul. 7, 2022

Related U.S. Application Data

(60) Provisional application No. 63/133,681, filed on Jan. 4, 2021.

(51) Int. Cl.
| | |
|---|---|
| *A01K 97/04* | (2006.01) |
| *B63B 45/02* | (2006.01) |
| *F21V 23/04* | (2006.01) |
| *F21V 23/00* | (2015.01) |
| *F21V 31/00* | (2006.01) |

(52) U.S. Cl.
CPC .............. *A01K 97/04* (2013.01); *B63B 45/02* (2013.01); *F21V 23/003* (2013.01); *F21V 23/04* (2013.01); *F21V 31/00* (2013.01)

(58) Field of Classification Search
CPC ....... A01K 97/04; B63B 45/02; F21V 23/003; F21V 23/04; F21V 31/00
USPC .......................................................... 362/580
See application file for complete search history.

(56) References Cited

U.S. PATENT DOCUMENTS

| | | | |
|---|---|---|---|
| 6,086,220 A | 7/2000 | Lash | |
| 7,507,993 B2 | 3/2009 | Lee | |
| 7,775,691 B2 | 8/2010 | Burgei | |
| 8,003,886 B1* | 8/2011 | Rintz | H02G 3/14 174/67 |
| 2010/0214785 A1* | 8/2010 | Chen | F21S 4/20 362/267 |
| 2011/0051415 A1* | 3/2011 | Chen | F21V 29/74 362/249.02 |
| 2011/0234424 A1* | 9/2011 | Chen | F21V 5/04 40/541 |
| 2013/0308308 A1* | 11/2013 | Pritchett | F21V 7/28 362/310 |
| 2014/0328064 A1* | 11/2014 | Mikami | F21V 29/74 362/249.01 |
| 2016/0135439 A1 | 5/2016 | Caprioli | |

(Continued)

*Primary Examiner* — Bryon T Gyllstrom

(57) ABSTRACT

The submersible light apparatus is a device that can provide a wireless and/or corded portable battery-operated underwater light that can provide light in multiple directions as well as attract marine life simultaneously. To that end, the device includes a center structure that houses associated electric circuitry that can power all the light sources of the device. Further, the device includes a chum (fish feed) housing, that is mounted around the center housing, and can disperse fish feed when submersed in water. The device may further include a retrieving line and a bridle that enables a user to pull the light from under water or from farther distances. Furthermore, the device includes a charging port and a switch that enables to turn the lights on/off or dim the lights. Additionally, the device includes a spherical transparent cover that provides a convenient and aesthetically pleasing protective covering.

19 Claims, 9 Drawing Sheets

(56) References Cited

U.S. PATENT DOCUMENTS

| | | | |
|---|---|---|---|
| 2016/0327213 A1 | 11/2016 | Zhou | |
| 2017/0122544 A1* | 5/2017 | Schmitt | F21V 31/005 |
| 2018/0192631 A1 | 7/2018 | Noga | |
| 2018/0206300 A1* | 7/2018 | Farnsworth | F21S 2/00 |
| 2021/0356110 A1* | 11/2021 | Zhang | H04R 1/028 |
| 2022/0186909 A1* | 6/2022 | He | G02B 19/0028 |

* cited by examiner

SUBMERSIBLE ILLUMINATING APPARATUS

FIELD OF THE INVENTION

The present invention relates generally to an illuminating device that could be used both under water and over land. More specifically, the present invention comprises a wireless and/or corded portable battery-operated electronic device, that has illuminators disposed on multiple surfaces of a deployable water-tight assembly.

BACKGROUND OF THE INVENTION

Portable battery-operated lights have been widely used in domestic, commercial and public environments. Light emitting diode (LED)s are revolutionizing conventional lighting methods due to their eco-friendly and user-friendly properties such as energy efficiency, extended life, instant illumination, and wide range of color availability. LEDs in different shapes and sizes are also available for use in different environments. However, an illuminating device that is capable of working well under water, over water, and on land, and which even has a fish feed (fish chum) housing built within, is a rarity. In environments such as marinas, docks, and the like, underwater lighting provides enhanced visibility for dockside operations and near-shore navigation, as well as providing aesthetic improvements to the look of dock areas. An underwater or marine light is capable of maximizing a boat's visibility to other boaters during darkness and inclement weather conditions, as well as attracting marine life. However, most of the underwater lights available in the market have either long cables or retrieving lines dispersed loosely outside the light structure and can only provide light in one direction.

An objective of the present invention is to provide a wireless and/or corded portable battery-operated underwater light that can provide light in multiple directions simultaneously. The present invention comprises a light structure, wherein a center housing of the light structure is thinner than the two opposing end surfaces. The two opposing end surfaces have one or more illuminators or light sources (light emitting diodes (LEDs) in this case), wherein the illuminators provide light in the associated directions. Associated electric circuitry is fixed within the center housing and connected to the light sources mounted on multiple surfaces of the device. The size of the center housing, the size of the battery housed within the center housing, the number of illuminators used, and the surface area of the end surfaces may be varied according to various contemplated embodiments of the lighting device. According to the present invention, a single power source housed within the center housing can power the LEDs of the present invention that can provide light in 360 degrees. Further, the present invention comprises a chum (fish feed) housing, that is mounted around the center housing, that can house and disperse fish feed when submersed in water. It is additionally considered that the present invention may provide a lighting device that can attract marine life, illuminate water where power sources are not available, and temporarily decorate landscapes with water areas for events, parties etc. The present invention may comprise a retrieving line that enables a user to pull the light from under water or from farther distances. Further, the retrieving line can be spooled around the center housing when not in use. The present invention further comprises a charging port and a switch that enables to turn the lights on/off or dim the lights by means and methods familiar to any reasonably skilled individual. Additionally, the present invention comprises a spherical transparent cover that provides a convenient and aesthetically pleasing external shape. Furthermore, the present invention can be used as a floating lighting device, by attaching an additional float and a securing anchor to the center housing.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 9, the present invention is a is a submersible light apparatus. An objective of the present invention is to provide a wireless and/or corded portable battery-operated underwater light that can provide light in multiple directions simultaneously. The present invention comprises a light structure, wherein a center housing of the light structure is thinner than the two opposing end surfaces. The two opposing end surfaces have one or more illuminators or light sources (light emitting diodes (LEDs) in this case), wherein the illuminators provide light in the associated directions. Associated electric circuitry is fixed within the center housing and connected to the light sources on the two opposing end surfaces. The size of the center housing, the size of the battery housed within the center housing, the number of illuminators used, and the surface area of the end surfaces may be varied according to various contemplated embodiments of the lighting device. According to the present invention, a single power source housed within the center housing can power the LEDs of the present invention that can provide light in 360 degrees. Further, the present invention comprises a chum (fish feed) housing, that is mounted around the center housing, that can house and disperse fish feed when submersed in water. It is additionally considered that the present invention may provide a lighting device that can attract marine life, illuminate water where power sources are not available, and temporarily decorate landscapes with water areas for events, parties etc. The present invention may comprise a retrieving line that enables a user to pull the light from under water or from farther distances. Further, the retrieving line can be spooled around the center housing when not in use. The present invention further comprises a charging port and a switch that enables to turn the lights on/off or dim the lights by means and methods familiar to any reasonably skilled individual. Additionally, the present invention comprises a spherical transparent cover that provides a convenient and aesthetically pleasing external shape. Furthermore, the present invention can be used as a floating lighting device, by attaching an additional float and a securing anchor to the center housing.

Figure 1:
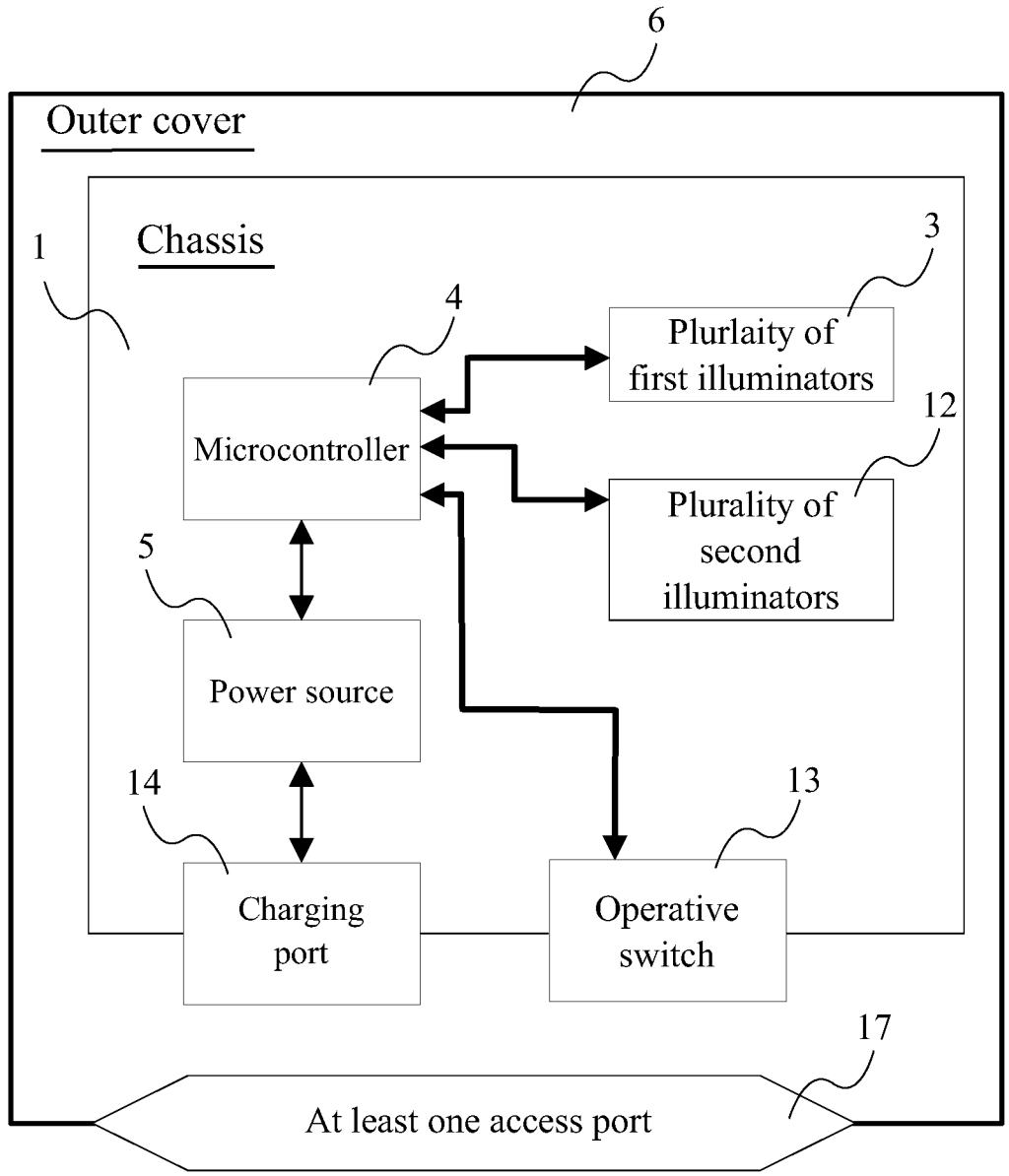
FIG. 1 is a block diagram wherein thinner flow lines represent electric connections and thicker flow lines represent electronic connections between components of the present invention.
Figure 2:
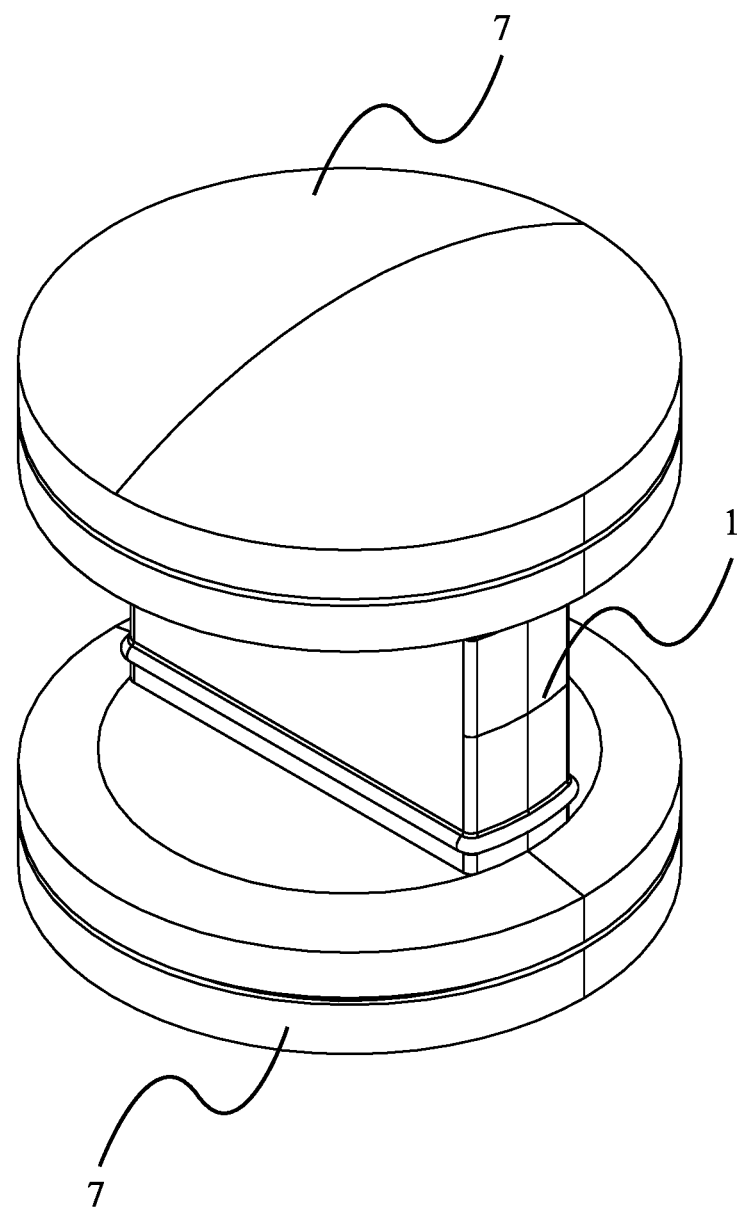
FIG. 2 is a top front left perspective view of the present invention.
Figure 3:
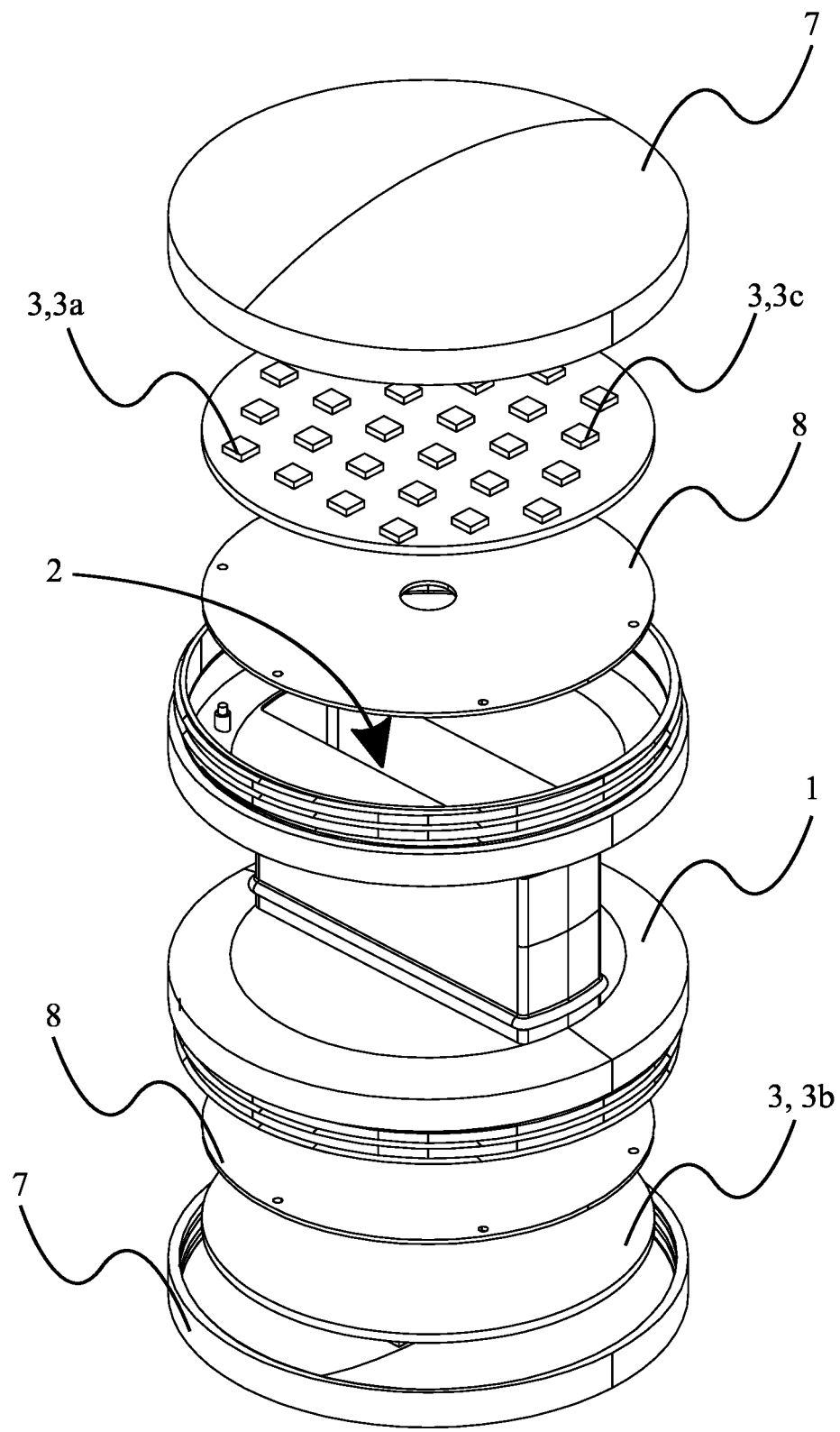
FIG. 3 is an exploded top front left perspective of the present invention.

The following description is in reference to FIG. 1 through FIG. 9. According to a preferred embodiment, the present invention comprises a chassis 1, a first cavity 2, a plurality of first illuminators 3, a microcontroller 4, a power source 5, and an outer cover 6. As seen in FIG. 2, the chassis 1 comprises a thinner center portion and broader end portions. The center portion and the end portions can be of any shape, size, features, type or kind, orientation, quantity, components, and arrangements of components that would allow the present invention to fulfill the objectives and intents of the present invention. However, in the preferred embodiment of the present invention, the center portion is rectangular in shape and comprises the first cavity 2 disposed within. In other words, the first cavity 2 traverses through the chassis 1, such that electrical components of the present invention may be mounted within the first cavity 2. Alternately, a circular center portion is also preferred for the chassis, such that circular electrical components may be housed within. Preferably, the chassis 1 comprises a solid composite material. However, any waterproof material that is known to one of ordinary skill in the art and that does not hinder the intended purpose of the present invention may be used.

According to the preferred embodiment, the plurality of first illuminators 3 are LEDs that provides light in the associated directions. However, any other sources and/or technology of light that are known to one of ordinary skill in the art may be employed for the plurality of first illuminators 3. More specifically, the color, size and number of illuminators used, and the associated circuitry can vary depending on the intended purpose or preference of the user. In reference to FIG. 2, the plurality of first illuminators 3 is mounted onto terminal ends of the chassis 1, such that light may be shown from opposing directions of the chassis 1. In other words, a first arbitrary set of illuminators 3a is positioned opposite to a second arbitrary set of illuminators 3b, wherein the first arbitrary set of illuminators 3a and the second arbitrary set of illuminators 3b are from the plurality of first illuminators 3.

As seen in FIG. 1, associated circuitry helps in providing power and enabling illumination of the plurality of first illuminators. To that end, the microcontroller 4 and the power source 5 are mounted within the chassis 1. Preferably, the power source 5 is electrically coupled to the microcontroller 4 and the microcontroller 4 is electronically coupled to the plurality of first illuminators 3. This is so that the power source 5 provides the necessary power to the different components of the present invention, and the microcontroller 4 controls the actions or operations of the different components of the present invention. Preferably, the microcontroller 4 is an embedded integrated circuit with the necessary specifications for controlling operations of the present invention. Preferably, the power source 5 is a rechargeable battery that fits within the chassis and that may be used to deliver electrical power to the microcontroller 4. However, any other source of power, or a combination of the following sources may be employed for the smooth functioning of the present invention. Examples of such power sources include, but are not limited to, Li ion batteries, magnetic power converters, solar power converters, power from an external power source etc. Further, the power source 5 may be of any shape, size, features, type or kind, orientation, quantity, components, and arrangements of components that would allow the present invention to fulfill the objectives and intents of the present invention.

Figure 7:
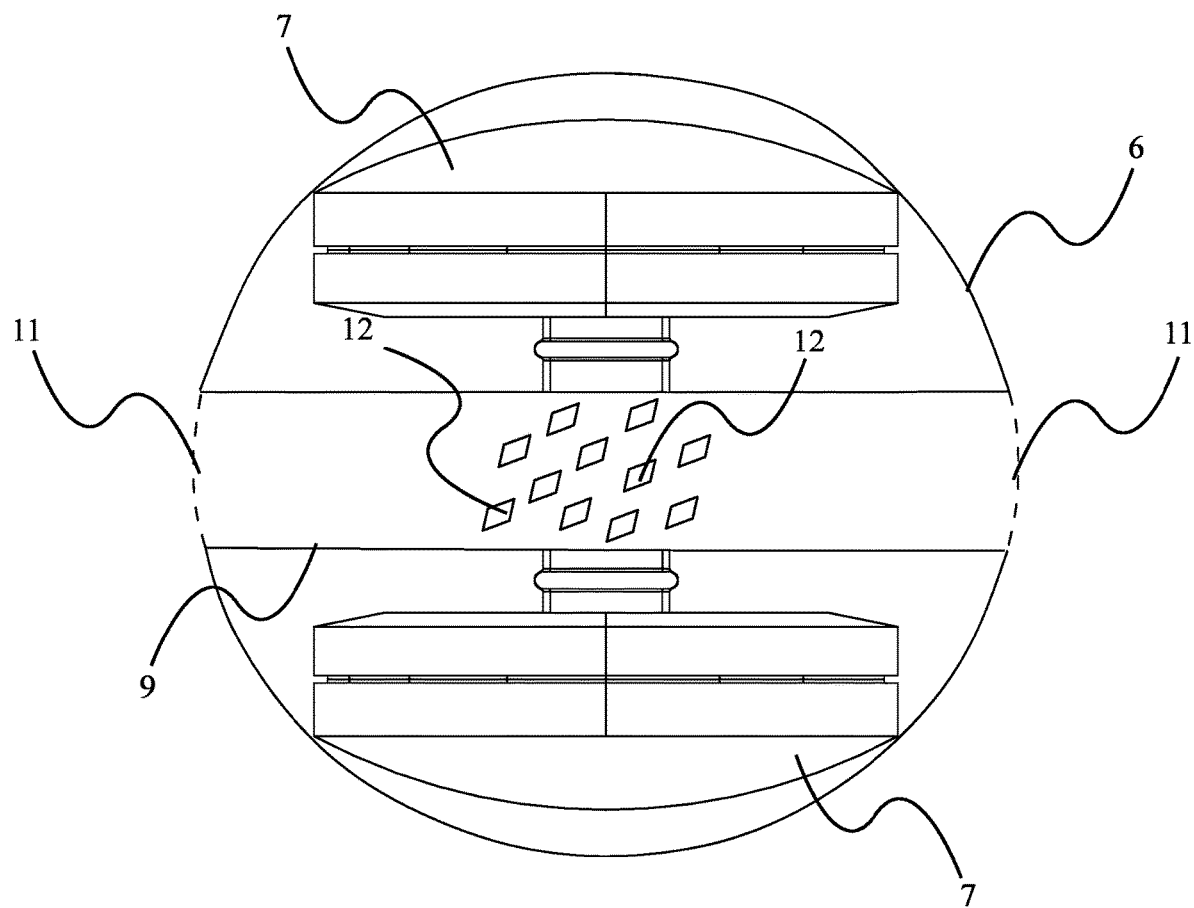
FIG. 7 is a left elevational view of the present invention, wherein a plurality of light sources is mounted around the chum chamber.
Figure 8:
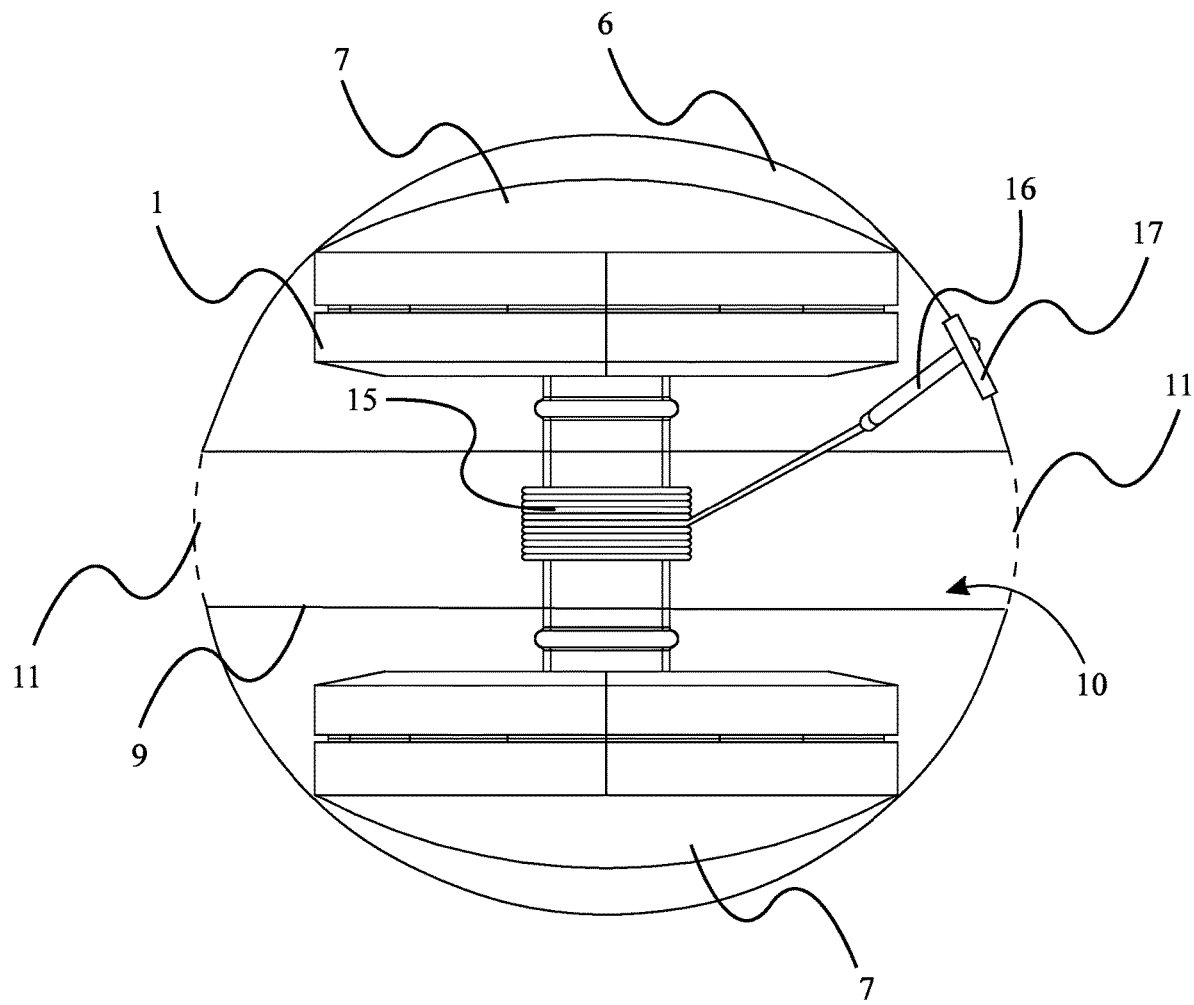
FIG. 8 is a left elevational view of the present invention, wherein the chum chamber is shown in phantom, and the retrieving cord is shown being spun around the center housing.
Figure 9:
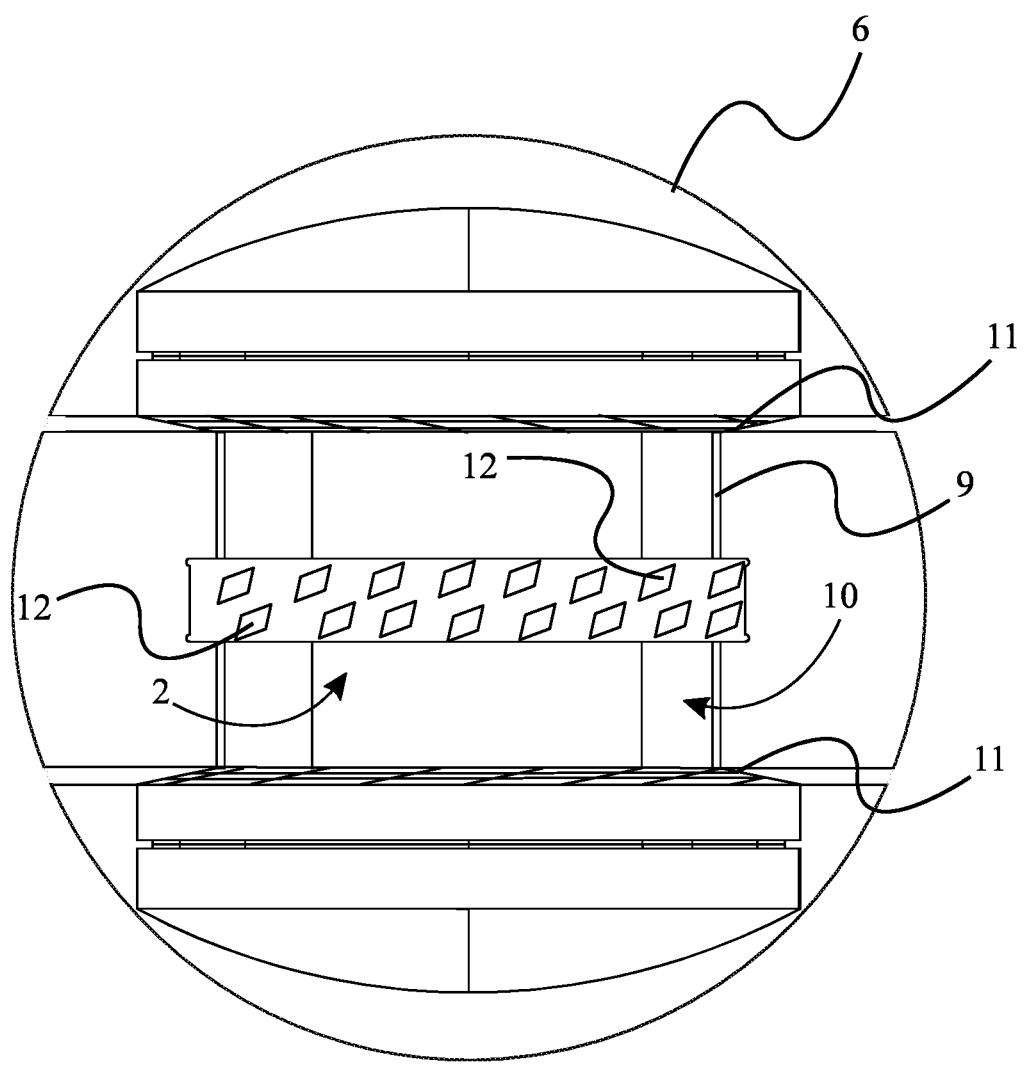
FIG. 9 is a front elevational view, wherein the chum chamber is mounted vertically around the center housing of the chassis.

As seen in FIG. 7 through FIG. 9, the present invention comprises a protective and aesthetically appealing outer cover 6, wherein the outer cover 6 encompasses the chassis 1 and the plurality of first illuminators 3. In the preferred embodiment, the outer cover 6 is spherical or globular in shape and made of a clear sturdy material such as poly carbon. However, the outer cover 6 may comprise any size, shape, components etc. and may include any other transparent and waterproof material, as long as the intents of the present invention are not altered.

In order to further provide additional protection and support, the present invention comprises a plurality of light covers 7, and a plurality of base mounts 8. Preferably, the plurality of light covers 7 encloses and protect the plurality of first illuminators 3 from external elements. The plurality of light covers 7 can be of any shape, size, features, type or kind, orientation, quantity, components, and arrangements of components that would allow the present invention to fulfill the objectives and intents of the present invention. However, it is preferred that the plurality of light covers 7 comprise transparent and/or semitransparent solid materials such that they allow light from the plurality of first illuminators 3 to illuminate the surrounding exterior, as well as to protect the plurality of first illuminators 3 from the outside environment. Such materials can include, but is not limited to, the following: glass, clear plastic, thermo plastics, polycarbonates, and/or other similarly related items. According to the present invention, the plurality of light covers is attached to the chassis 1 by screwing the inner lining of the light covers 7 over raised threads on the outer surfaces of the chassis 1. However, any attaching means that are known to one of ordinary skill in the art may be used. According to the present invention, the plurality of base mounts 8 separates the first cavity 2 from the plurality of first illuminators 3. To that end, each of the plurality of base mounts 8 is positioned below a corresponding set of illuminators 3c, wherein the corresponding set 3c is from the plurality of first illuminators 3.

It is an aim of the present invention to attract marine life as well as provide necessary guidance in the form of light to mariners. To that end, the present invention comprises a fish chum chamber 9, a second cavity 10, and a plurality of chum chamber covers 11. Preferably, the fish chum chamber 9 is an elongated tube that may be mounted vertically or horizontally around the center portion of the chassis 1. In other words, the fish chum chamber 9 is mounted around the thinner portion of the chassis 1. In reference to FIG. 6 through FIG. 8, the fish chum chamber 9 is mounted horizontally along a length of the chassis 1. However, in reference to FIG. 9, the fish chum chamber 9 is mounted vertically along the length of the chassis 1.

Further, the second cavity 10 traverses through the fish chum chamber 9, such that fish chum or fish feed may be housed within the second cavity 10. In order to contain the fish feed within the fish chum chamber 9, the plurality of chum chamber covers 11 is mounted onto terminal ends of the fish chum chamber 9. Furthermore, in order to dispense the fish chum as the present invention comes in contact with water, the plurality of chum chamber covers 11 is perforated. According to the preferred embodiment, the outer cover 6 encompasses the fish chum chamber 9 and the plurality of second illuminators 12. However, in order to prevent interruption of dispensing of the fish chum, the plurality of chum chamber covers 11 is communicably coupled between the outer cover 6 and the fish chum chamber 9, wherein the second cavity 10 is in fluid communication with an external environment outside the outer cover 6. In other words, as the invention gets submerged in water, fish chum from within the fish chum chamber 9 gets dispersed into water through the small holes on the plurality of chum chamber covers 11.

It is further an aim of the present invention to provide light in multiple directions as the submersible lighting device is being placed on or under water. To accomplish this, the present invention comprises a plurality of second illuminators 12. Preferably, the plurality of second illuminators 12 is laterally mounted onto the fish chum chamber 9, and the plurality of second illuminators 12 is electronically coupled to the microcontroller 4. However, the number, color, orientation, size, position, and shape of the plurality of second illuminators 12 may vary depending on the need of the user. Thus, the present invention may provide light is 360 degrees, based on the orientation and positioning of the plurality of second illuminators 12. In other words, the plurality of first illuminators 3 and the plurality of second illuminators 12 together provide 360 degrees illumination around the chassis 1.

In the preferred embodiment, the submersible light apparatus further comprises outer components. To that end, and in reference to FIG. 1, the present invention may comprise an operative switch 13, wherein the operative switch 13 is mounted onto the chassis 1. Preferably, the operative switch 13 enables a user to turn the plurality of first illuminators and the plurality of second illuminators 12, between on/off or dim stages. To that end, the operative switch 13 is electronically coupled to the microcontroller 4. However, the switch 13 may comprise any other HID (human interface device) that is known to one of ordinary skill in the art, as long as the intents of the present invention are not altered. In order to enable charging of a rechargeable power source which may be housed within the chassis 1, the present invention comprises a charging port 14. Preferably, the charging port 14 is mounted onto the chassis 1, and the charging port 14 is electronically coupled to the microcontroller 4. The charging port 14 and the operative switch 13 can be of any shape, size, features, type or kind, orientation, quantity, components, and arrangements of components that would allow the present invention to fulfill the objectives and intents of the present invention. However, it is preferred that the charging port 14 and the switch 13 comprise waterproof materials and are disposed on the outer surface of the chassis 1 within the center portion.

Figure 4:
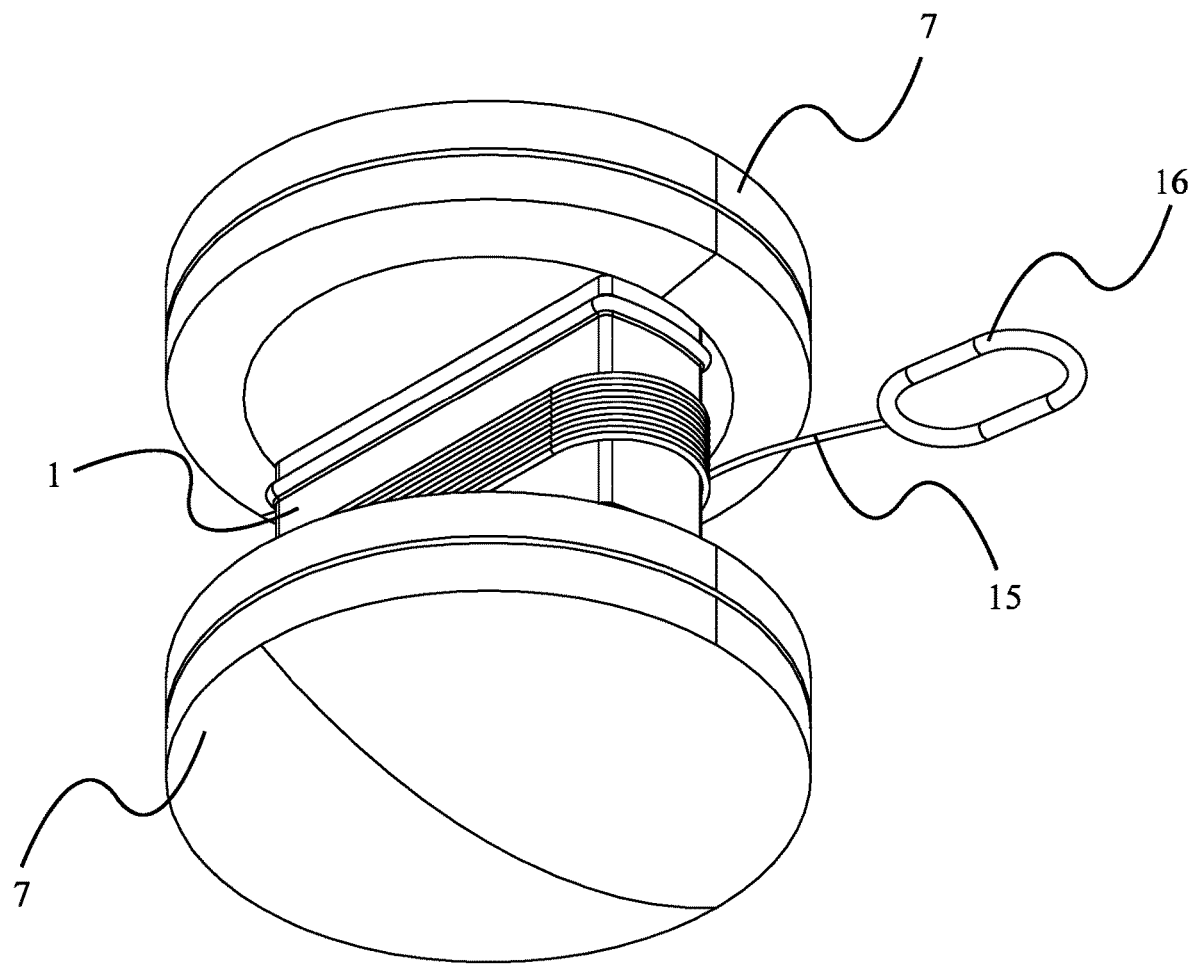
FIG. 4 is a bottom rear right perspective view of the present invention, wherein a retrieving cord and associated fastener is shown.
Figure 5:
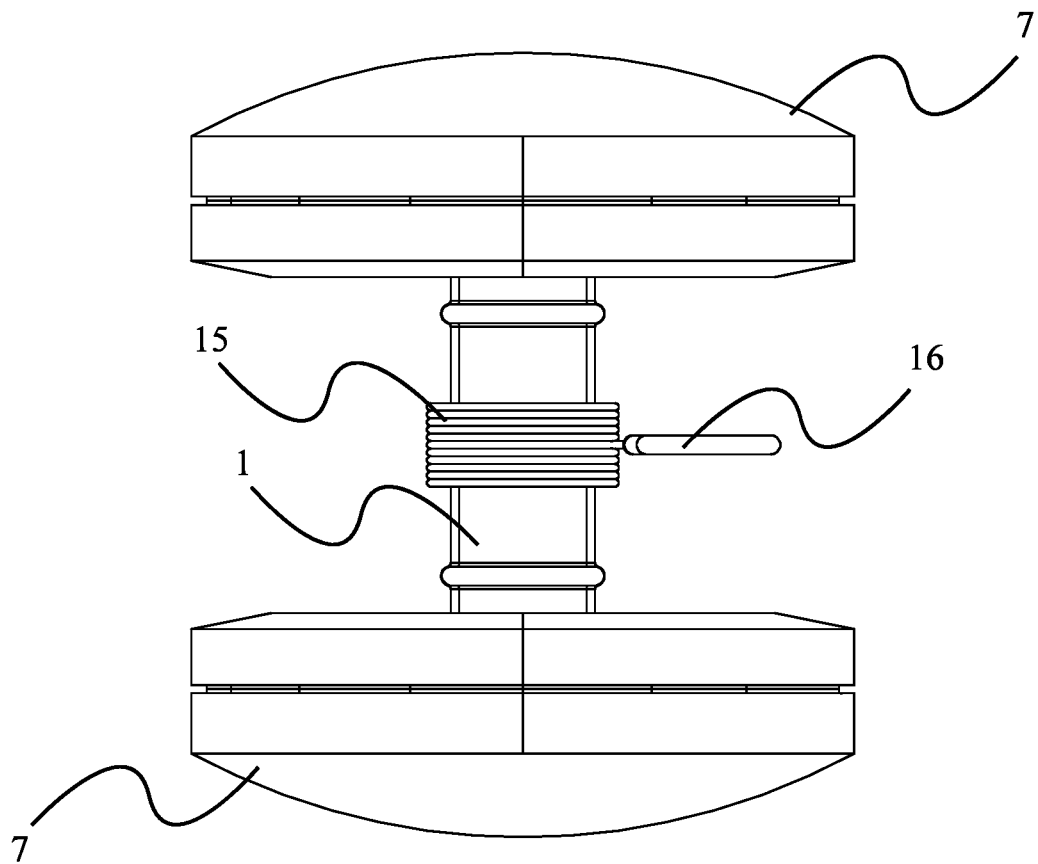
FIG. 5 is a left elevational view of the present invention.
Figure 6:
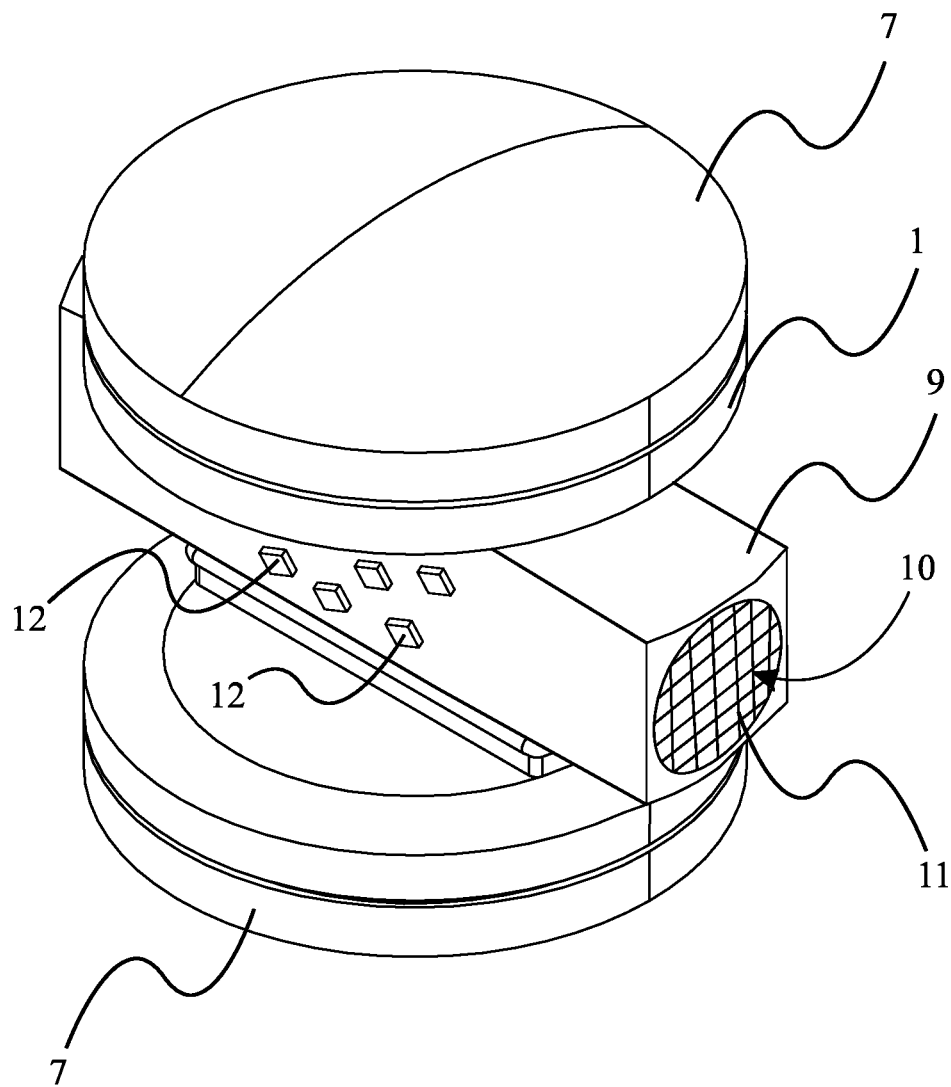
FIG. 6 is a top front left perspective view, wherein a chum chamber is mounted horizontally along the chassis.

As seen in FIG. 4, FIG. 5, and FIG. 8, the submersible light apparatus comprises a retrieval cord 15 and a fastener 16. Preferably, the retrieval cord 15 enables the lighting device to be retrieved when used in deep waters and/or when used as a floating light on the surface of water. The retrieval cord 15 can comprise any shape, size, features, type or kind, orientation, and material, that would allow the present invention to fulfill the objectives of the present invention. However, it is preferred that the retrieval cord 15 comprises a strain relief on one or both ends and may be easily spooled around the center portion of the chassis 1, when not in use. To that end, the retrieval cord 15 is mounted inside the outer cover 6, and the fastener 16 is mounted onto a terminal end of the retrieval cord 15. In other words, one end of the retrieval cord 15 is attached to the chassis 1, and the other end may have any kind of fastener, clasp, bridle, clip or hold, that is known to one of ordinary skill in the art for easily attaching to the outer cover or any holding surface. To easily access all the internal components housed within the outer cover 6, the present invention comprises at least one access port 17. Preferably, the at least one access port 17 traverses through the outer cover 6, such that the fastener 16 is accessible through the access port 17 and the retrieval cord 15 is made retractable and deployable through the access port 17. Additionally, the charging port 14 and the operative switch 13 may also be made accessible through the at least one access port 17.

In an alternate embodiment, the present invention may comprise a float attached to the center portion of the chassis, such that the submersible light apparatus will float on the surface of water, providing light in two opposing directions on any water surface. For deep sea operations or otherwise, an additional anchor with a fixed weight may be attached to the submersible light apparatus by means of a long string/cord, such that the submersible light apparatus stays at a particular location on the surface of water and does not float freely.

Although the invention has been explained in relation to its preferred embodiment, it is to be understood that many other possible modifications and variations can be made without departing from the spirit and scope of the invention as hereinafter claimed.

What is claimed is:
1. A submersible lighting device, comprising:
a chassis;
a first cavity;
a plurality of first illuminators;
a microcontroller;
a power source;
an outer cover;
the first cavity traversing into the chassis;
a plurality of light covers;
a plurality of base mounts;
the plurality of first illuminators being mounted onto terminal ends of the chassis;
a first arbitrary set of illuminators being positioned opposite to a second arbitrary set of illuminators, wherein the first arbitrary set of illuminators and the second arbitrary set of illuminators are from the plurality of first illuminators;
the microcontroller and the power source being mounted within the chassis;
the power source being electrically coupled to the microcontroller;
the microcontroller being electronically coupled to the plurality of first illuminators;
the outer cover encompassing the chassis and the plurality of first illuminators;
the plurality of light covers covering the plurality of first illuminators; and
each of the plurality of base mounts being mounted below a corresponding set of illuminators, wherein the corresponding set of illuminators is from the plurality of first illuminators.
2. The submersible lighting device of claim 1, comprising:
a fish chum chamber;
a second cavity;
a plurality of chum chamber covers;

the second cavity traversing through the fish chum chamber;

the fish chum chamber being mounted around the chassis;

the plurality of chum chamber covers being mounted onto terminal ends of the fish chum chamber.

3. The submersible lighting device of claim 2, comprising:
a plurality of second illuminators;
the plurality of second illuminators being laterally mounted onto the fish chum chamber; and
the plurality of second illuminators being electronically coupled to the microcontroller.

4. The submersible lighting device of claim 2, wherein the outer cover encompasses the fish chum chamber and the plurality of second illuminators.

5. The submersible lighting device of claim 2, wherein the plurality of chum chamber covers being perforated.

6. The submersible lighting device of claim 2, comprising:
the plurality of chum chamber covers being communicably coupled between the outer cover and the fish chum chamber, wherein the second cavity being in fluid communication with an external environment outside the outer cover.

7. The submersible lighting device of claim 2, wherein the plurality of first illuminators and the plurality of second illuminators together provide 360 degrees illumination around the chassis.

8. The submersible lighting device of claim 1, comprising:
an operative switch;
the operative switch being mounted onto the chassis; and
the operative switch being electronically coupled to the microcontroller.

9. The submersible lighting device of claim 1, comprising:
a charging port;
the charging port being mounted onto the chassis; and
the charging port being electronically coupled to the microcontroller.

10. The submersible lighting device of claim 1, comprising:
a retrieval cord;
a fastener;
at least one access port;
the retrieval cord being mounted inside the outer cover;
the fastener being mounted onto a terminal end of the retrieval cord;
the at least one access port traversing through the outer cover;
the fastener being accessible through the access port; and
the retrieval cord being retractable and deployable through the access port.

11. The submersible lighting device of claim 1, wherein the outer cover being transparent.

12. The submersible lighting device of claim 1, wherein the outer cover being spherical.

13. A submersible lighting device, comprising:
a chassis;
a first cavity;
a plurality of first illuminators;
a microcontroller;
a power source;
a fish chum chamber;
a second cavity;
a plurality of chum chamber covers;
an outer cover;

the first cavity traversing into the chassis;
the plurality of first illuminators being mounted onto terminal ends of the chassis;
a first arbitrary set of illuminators being positioned opposite to a second arbitrary set of illuminators, wherein the first arbitrary set of illuminators and the second arbitrary set of illuminators are from the plurality of first illuminators;
the microcontroller and the power source being mounted within the chassis;
the power source being electrically coupled to the microcontroller;
the microcontroller being electronically coupled to the plurality of first illuminators;
the second cavity traversing through the fish chum chamber;
the fish chum chamber being mounted around the chassis;
the plurality of chum chamber covers being mounted onto terminal ends of the fish chum chamber; and
the outer cover encompassing the chassis, the fish chum chamber, and the plurality of first illuminators.

14. The submersible lighting device of claim 13, comprising:
a plurality of second illuminators;
the plurality of second illuminators being laterally mounted onto the fish chum chamber; and
the plurality of second illuminators being electronically coupled to the microcontroller.

15. The submersible lighting device of claim 13, wherein the outer cover encompasses the fish chum chamber and the plurality of second illuminators.

16. The submersible lighting device of claim 13, wherein the plurality of chum chamber covers being perforated.

17. The submersible lighting device of claim 13, comprising:
the plurality of chum chamber covers being communicably coupled between the outer cover and the fish chum chamber, wherein the second cavity being in fluid communication with an external environment outside the outer cover.

18. The submersible lighting device of claim 13, comprising:
a plurality of light covers;
a plurality of base mounts;
the plurality of light covers covering the plurality of first illuminators;
each of the plurality of base mounts being mounted below a corresponding set of illuminators, wherein the corresponding set of illuminators is from the plurality of first illuminators.

19. The submersible lighting device of claim 13, comprising:
an operative switch;
a charging port;
a retrieval cord;
a fastener;
at least one access port;
the operative switch being mounted onto the chassis;
the charging port being mounted onto the chassis;
the operative switch and the charging port being electronically coupled to the microcontroller;
the retrieval cord being mounted inside the outer cover;
the fastener being mounted onto a terminal end of the retrieval cord;
the at least one access port traversing through the outer cover;
the fastener being accessible through the access port; and the retrieval cord being retractable and deployable through the access port.

* * * * *